(12) United States Patent
Wada et al.

(10) Patent No.: US 7,319,810 B2
(45) Date of Patent: Jan. 15, 2008

(54) PROGRAM RECORDING APPARATUS AND PROGRAM RECORDING MEDIUM

(75) Inventors: Hirofumi Wada, Toyonaka (JP); Hiroshi Yasuno, Shijonawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/292,094

(22) Filed: Dec. 2, 2005

(65) Prior Publication Data

US 2006/0083484 A1 Apr. 20, 2006

Related U.S. Application Data

(63) Continuation of application No. 09/722,643, filed on Nov. 28, 2000.

(51) Int. Cl.
*H04N 7/00* (2006.01)
*H04N 5/91* (2006.01)

(52) U.S. Cl. .......................... 386/83; 386/46
(58) Field of Classification Search .................. 386/83, 386/125, 46, 1, 94, 95, 124
See application file for complete search history.

(56) References Cited

U.S. PATENT DOCUMENTS

| | | | |
|---|---|---|---|
| 5,260,788 A | 11/1993 | Takano et al. | |
| 5,361,173 A | 11/1994 | Ishii et al. | |
| 5,390,027 A | 2/1995 | Henmi et al. | |
| 5,541,738 A | 7/1996 | Mankovitz | |
| 5,977,964 A * | 11/1999 | Williams et al. | 715/721 |
| 6,031,806 A | 2/2000 | Tomita | |
| 6,035,091 A | 3/2000 | Kazo | |
| 6,301,427 B1 | 10/2001 | Kazo | |
| 6,324,338 B1 | 11/2001 | Wood et al. | |
| 6,463,206 B1 | 10/2002 | Yuen et al. | |
| 6,553,180 B1 | 4/2003 | Kikuchi et al. | |
| 6,751,401 B1 | 6/2004 | Arai et al. | |
| 6,850,690 B1 | 2/2005 | Noguchi et al. | |
| 2003/0012555 A1 | 1/2003 | Yuen et al. | |

FOREIGN PATENT DOCUMENTS

| | | |
|---|---|---|
| EP | 0 439 290 | 7/1991 |
| GB | 2 268 361 A | 1/1994 |
| JP | 2-173842 | 7/1990 |
| JP | 5-234179 | 9/1993 |
| JP | 6-36388 | 2/1994 |
| JP | 6-332760 | 12/1994 |

(Continued)

OTHER PUBLICATIONS

European Search Report, issued for corresponding European Application No. EP 00 12 6214, dated Nov. 7, 2003.

(Continued)

*Primary Examiner*—Robert Chevalier
(74) *Attorney, Agent, or Firm*—Smith, Gambrell & Russell, LLP

(57) ABSTRACT

A program recording apparatus has a program information input unit inputting program information concerning programs; a program recording setting unit setting of the recording of programs; a recording unit writing in, and erasing, data containing the contents of the programs to and from a recording medium; and a management unit storing program information.

22 Claims, 21 Drawing Sheets present time 1999/08/12 20:30 maximum recording time
12 hours program erasure priority criterion broadcast start date and time

| channel | program group title | program group recording conditions | program group erasure possibility conditions | recording setter | viewer limitation (password) | program recording condition (recording time) | | | total usage time |
|---|---|---|---|---|---|---|---|---|---|
| 12 | News Seven | recording of newest program (1) | erasable | A | nil | recorded (1 hour) 1999/0811/07:00 | recorded (1 hour) 1999/0812/07:00 | | 2 hours in total |
| 10 | Holiday in Los Angeles | recording of newest program (2) | non-erasable | B | nil | recorded (2 hour) 1999/0809/21:00 | set for recording (2 hours) 1999/0816/21:00 | | 4 hours in total |
| 08 | Professional Baseball Game A vs. B | — | erasable | A | exists (***) | recorded (3 hour) 1999/0810/18:00 | | | 3 hours in total |
| 06 | It Will be Sunny Tomorrow | recording of newest program (3) | non-erasable | C | nil | recorded (1 hour) 1999/0728/20:00 | recorded (1 hour) 1999/0804/20:00 | recorded (1 hour) 1999/0811/20:00 | 3 hours in total |

FOREIGN PATENT DOCUMENTS

| | | |
|---|---|---|
| JP | 7-37369 | 2/1995 |
| JP | 8-329558 | 12/1996 |
| JP | 10-112087 | 4/1998 |
| JP | 10-222963 | 8/1998 |
| JP | 10-241226 | 9/1998 |
| JP | 11-18039 | 1/1999 |
| JP | 11-127396 | 5/1999 |
| JP | 11-168667 | 6/1999 |
| JP | 11-176144 | 7/1999 |
| JP | 11-215466 | 8/1999 |
| JP | 11-260043 | 9/1999 |
| JP | 2000-21136 A | 1/2000 |

OTHER PUBLICATIONS

Chinese Office Action dated Jan. 2, 2004, with English-language translation.
Japanese Patent Office, Office Action for corresponding Japanese Patent Application No. 11-341024.
JPO Action dated Apr. 18, 2006 with translated portions.
Japanese Patent Office action mailed Jun. 14, 2007.
Office Action issued by Japan Patent Office on Aug. 21, 2007 in corresponding patent application.

\* cited by examiner

Fig. 2

| channel | program title | broadcast date and time | genre | program summary | television personalities | series information (broadcast mode) |
|---|---|---|---|---|---|---|
| 12 | News Seven (August 8) | 1999/0808/07:00 08:00 | news | — | Taro Yamamoto | News Seven (continuous every day/ all year round) |
| | Total Solar Eclipse (first) | 1999/0812/21:00 23:00 | documentary | — | Hanako Yamashita Shotaro Kato | Total Solar Eclipse (continuous every day/ 1 of 2) |
| | Total Solar Eclipse (second) | 1999/0813/21:00 23:00 | documentary | — | Hanako Yamashita Shotaro Kato | Total Solar Eclipse (continuous every day/ 2 of 2) |
| 10 | Holiday in Los Angeles (Part 25 Secret) | 1999/0809/21:00 23:00 | movie | Story of Tragic Love Set in Los Angeles | John Long Catherine Ross | Holiday in Los Angeles (continuous every week/ 25 of 50) |
| | Holiday in Los Angeles (Part 26 Informer's Report) | 1999/0816/21:00 23:00 | movie | Story of Tragic Love Set in Los Angeles | John Long Catherine Ross | Holiday in Los Angeles (continuous every week/ 26 of 50) |
| 08 | Professional Baseball Game A vs. B (eighth game) | 1999/0810/18:00 21:00 | sports | — | — | Professional Baseball Game A vs. B (broadcast interval not determined/ 8 of 12) |
| 06 | It Will be Sunny Tomorrow (sixth) | 1999/0728/20:00 21:00 | drama | — | — | It Will be Sunny Tomorrow (continuous every week/ 6 of 12) |
| | It Will be Sunny Tomorrow (seventh) | 1999/0804/20:00 21:00 | drama | — | — | It Will be Sunny Tomorrow (continuous every week/ 7 of 12) |
| | It Will be Sunny Tomorrow (eighth) | 1999/0811/20:00 21:00 | drama | — | — | It Will be Sunny Tomorrow (continuous every week/ 8 of 12) |

Fig. 3 present time 1999/08/12 20:30  maximum recording time 12 hours  program erasure priority criterion broadcast start date and time

| channel | program group title | program group recording conditions | program group erasure possibility conditions | recording setter | viewer limitation (password) | program recording condition (recording time) | | | | total usage time |
|---|---|---|---|---|---|---|---|---|---|---|
| 12 | News Seven | recording of newest program (1) | erasable | A | nil | recorded (1 hour) 1999/0811/07:00 | recorded (1 hour) 1999/0812/07:00 | | | 2 hours in total |
| 10 | Holiday in Los Angeles | recording of newest program (2) | non-erasable | B | nil | recorded (2 hour) 1999/0809/21:00 | set for recording (2 hours) 1999/0815/21:00 | | | 4 hours in total |
| 08 | Professional Baseball Game A vs. B | ——— | erasable | A | exists (***) | recorded (3 hour) 1999/0810/18:00 | | | | 3 hours in total |
| 06 | It Will be Sunny Tomorrow | recording of newest program (3) | non-erasable | C | nil | recorded (1 hour) 1999/0728/20:00 | recorded (1 hour) 1999/0804/20:00 | recorded (1 hour) 1999/0811/20:00 | | 3 hours in total |

Fig. 4 present time 1999/08/12 20:30　maximum recording time
12 hours　program erasure priority criterion broadcast
start date and time

| channel | program group title | program group recording conditions | program group erasure possibility conditions | recording setter | viewer limitation (password) | program recording condition (recording time) | | | total usage time |
|---|---|---|---|---|---|---|---|---|---|
| 12 | News Seven | recording of newest program (1) | erasable | A | nil | recorded (1 hour) 1999/0811/07:00 | recorded (1 hour) 1999/0812/07:00 | | 2 hours in total |
| 10 | Holiday in Los Angeles | recording of newest program (2) | non-erasable | B | nil | recorded (2 hour) 1999/0809/21:00 | set for recording (2 hours) 1999/0816/21:00 | | 4 hours in total |
| 08 | Professional Baseball Game A vs. B | ——— | erasable | A | exists (***) | recorded (3 hour) 1999/0810/18:00 | | | 3 hours in total |
| 06 | It Will be Sunny Tomorrow | recording of newest program (3) | non-erasable | C | nil | recorded (1 hour) 1999/0728/20:00 | recorded (1 hour) 1999/0804/20:00 | recorded (1 hour) 1999/0811/20:00 | 3 hours in total |
| 12 | Total Solar Eclipse | recording of programs (all) | non-erasable | A | nil | set for recording (2 hours) 1999/0812/21:00 | set for recording (2 hours) 1999/0813/21:00 | | 4 hours in total |
| | | | | | | | | | |

Fig. 5 present time 1999/08/12 20:41    maximum recording time
12 hours   program erasure priority criterion broadcast
start date and time

| channel | program group title | program group recording conditions | program group erasure possibility conditions | recording setter | viewer limitation (password) | program recording condition (recording time) | | | | total usage time |
|---|---|---|---|---|---|---|---|---|---|---|
| 12 | News Seven | recording of newest program (1) | erasable | A | nil | recorded (1 hour) 1999/08/11/07:00 | recorded (1 hour) 1999/08/12/07:00 | | | 2 hours in total |
| 10 | Holiday in Los Angeles | recording of newest program (2) | non-erasable | B | nil | recorded (2 hour) 1999/08/09/21:00 | set for recording (2 hours) 1999/08/16/21:00 | | | 4 hours in total |
| 08 | Professional Baseball Game A vs. B | ——— | erasable | A | exists (***) | recorded (3 hour) 1999/08/10/18:00 | | | | 3 hours in total |
| 06 | It Will be Sunny Tomorrow | recording of newest program (3) | non-erasable | C | nil | recorded (1 hour) 1999/07/28/20:00 | recorded (1 hour) 1999/08/04/20:00 | recorded (1 hour) 1999/08/11/20:00 | | 3 hours in total |
| 12 | Total Solar Eclipse | recording of programs (all) | non-erasable | A | nil | set for recording (2 hours) 1999/08/12/21:00 | set for recording (2 hours) 1999/08/13/21:00 | | | 4 hours in total |
| | | | | | | | | | | |

Fig. 6 present time 1999/08/13 21:00   maximum recording time
12 hours   program erasure priority criterion broadcast
start date and time

| channel | program group title | program group recording conditions | program group erasure possibility conditions | recording setter | viewer limitation (password) | program recording condition (recording time) | | total usage time |
|---|---|---|---|---|---|---|---|---|
| 12 | News Seven | recording of newest program (1) | erasable | A | nil | recorded (1 hour) 1999/0811/07:00 | ~~recorded (1 hour) 1999/0812/07:00~~ | 2 hours in total |
| 10 | Holiday in Los Angeles | recording of newest program (2) | non-erasable | B | nil | recorded (2 hours) 1999/0809/21:00 | set for recording (2 hours) 1999/0816/21:00 | 4 hours in total |
| 06 | It Will be Sunny Tomorrow | recording of newest program (3) | non-erasable | C | nil | recorded (1 hour) 1999/0728/20:00 | recorded (1 hour) 1999/0804/20:00 | 3 hours in total |
| 12 | Total Solar Eclipse | recording of programs (all) | non-erasable | A | | recorded (2 hours) 1999/0812/21:00 | recording (2 hours) 1999/0813/21:00 | 4 hours in total |

Fig. 7 present time 1999/08/12 20:40   maximum recording time
12 hours   program erasure priority criterion broadcast
start date and time recording setter A password

| channel | program title | program group recording conditions | program group erasure possibility conditions | program recording condition (recording time) | | |
|---|---|---|---|---|---|---|
| 12 | News Seven | recording of newest program (1) | erasable | recorded (1 hour) 1999/08/11 07:00 | recorded (1 hour) 1999/08/12 07:00 | |
| 08 | Professional Baseball Game A vs. B | | erasable | recorded (3 hour) 1999/08/10 18:00 | | |
| 12 | Total Solar Eclipse | recording of programs (all) | non-erasable | set for recording (2 hours) 1999/08/12 21:00 | set for recording (2 hours) 1999/08/13 21:00 | |

B
C

Fig. 8 present time 1999/08/12 20:41   maximum recording time
12 hours   program erasure priority criterion   broadcast
start date and time

| recording setter A password | | | | |
|---|---|---|---|---|
| C | | | | |
| B | | | | |
| channel | program title | program group recording conditions | program group erasure possibility conditions | program recording condition (recording time) |
| 12 | News Seven | recording of newest program (1) | erasable | recorded (1 hour) 1999/0811/07:00 / recorded (1 hour) 1999/0812/07:00 |
| 08 | Professional Baseball Game A vs. B | | erasable | recorded (3 hour) 1999/0810/18:00 |
| 12 | Total Solar Eclipse | recording of programs (all) | non-erasable | set for recording (2 hours) 1999/0812/21:00 / set for recording (2 hours) 1999/0813/21:00 |

Fig. 10 present time 1997/04/09 10:00
maximum recording capacity 8.5GB recorded program

| | program title | program recording capacity | broadcast start date and time | number of playbacks/dubbings | erasure possibility |
|---|---|---|---|---|---|
| 12ch | News ABC | 1GB | 97/04/01 18:01 | 1 | erasable |
| 2ch | Drama XYZ | 1GB | 97/04/01 19:00 | 1 | non-erasable |
| 6ch | Baseball Game ab vs. cd 01 | 2GB | 97/03/18 18:00 | 1 | erasable |
| 6ch | Baseball Game ab vs. cd 02 | 2GB | 97/03/19 18:00 | 0 | erasable |
| 12ch | English Conversation 3 | 0.5GB | 97/03/18 06:00 | 5 | erasable |
| 12ch | News CDF 2 | 1GB | 97/04/08 18:01 | 1 | erasable |
| 4ch | Drama XXX | 1GB | 97/04/08 19:00 | 0 | erasable |
| capacity management | already recorded capacity 8.5GB    vacant capacity 0GB<br>re-writable capacity 7.5GB    non-erasable capacity 1GB | | | | | programs set for recording

| | program title | program recording capacity | broadcast start date and time | number of playbacks/dubbings | erasure possibility |
|---|---|---|---|---|---|
| 6ch | Baseball Game ab vs. cd 12 | 3GB | 97/04/09 18:00 | 0 | non-erasable |
| capacity management | capacity for programs set for recording 3GB<br>potential capacity for programs set for recording 4.5GB | | | | |

Fig. 11 present time 1997/04/09 10:10
maximum recording capacity 8.5GB recorded program

| | program title | program recording capacity | broadcast start date and time | number of playbacks/dubbings | erasure possibility |
|---|---|---|---|---|---|
| 12ch | News ABC | 1GB | 97/04/01 18:01 | 1 | erasable |
| 2ch | Drama XYZ | 1GB | 97/04/01 19:00 | 1 | erasable |
| 6ch | Baseball Game ab vs. cd 01 | 2GB | 97/03/18 18:00 | 1 | erasable |
| 6ch | Baseball Game ab vs. cd 02 | 2GB | 97/03/19 18:00 | 0 | erasable |
| 12ch | English Conversation 3 | 0.5GB | 97/03/18 06:00 | 5 | non-erasable |
| 12ch | News CDF 2 | 1GB | 97/04/08 18:01 | 1 | erasable |
| 4ch | Drama XXX | 1GB | 97/04/08 19:00 | 0 | erasable |
| capacity management | recorded capacity 8.5GB  vacant capacity 0GB  re-writable capacity 8GB  non-erasable capacity 0.5GB | | | | | programs set for recording

| | program title | program recording capacity | broadcast start date and time | number of playbacks/dubbings | erasure possibility |
|---|---|---|---|---|---|
| 6ch | Baseball Game ab vs. cd 12 | 3GB | 97/04/09 18:00 | 0 | non-erasable |
| 6ch | Baseball Game ab vs. cd 13 | 1.5GB | 97/04/12 18:00 | 0 | erasable |
| capacity management | capacity for programs set for recording 4.5GB  potential capacity for programs set for recording 3.5GB | | | | |

Fig. 12 present time 1997/04/09 10:00
maximum recording capacity 8.5GB

| program erasure priority criterion | | program title | program recording capacity | erasure priority | erasure plan (date and time) |
|---|---|---|---|---|---|
| playback number | broadcast start date and time | | | | |
| playback once | 97/03/18 18:00 | Baseball Game ab vs. cd 01 | 2GB | first | erasure plan (4/9 18:00) |
| | 97/04/01 18:01 | News ABC | 1GB | second | erasure plan (4/9 18:00) |
| | 97/04/01 19:00 | Drama XYZ | 1GB | non-erasable | |
| | 97/04/08 18:01 | News CDF | 1GB | third | |
| playback twice or more | 97/03/18 06:00 | English Conversation 3 | 0.5GB | fourth | |
| no playback | 97/03/19 18:00 | Baseball Game ab vs. cd 02 | 2GB | fifth | |
| | 97/04/08 19:00 | Drama XXX | 1GB | sixth | |
| set for recording | 97/04/09 18:00 | Baseball Game ab vs. cd 12 | 3GB | non-erasable | |

Fig. 13 present time 1997/04/09 10:10
maximum recording capacity 8.5GB

| program erasure priority criterion | | program title | program recording capacity | erasure priority | erasure plan (date and time) |
|---|---|---|---|---|---|
| playback number | broadcast start date and time | | | | |
| playback once | 97/03/18 18:00 | Baseball Game ab vs. cd 01 | 2GB | first | erasure plan (4/9 18:00) |
| | 97/04/01 18:01 | News ABC | 1GB | second | erasure plan (4/9 18:00) |
| | 97/04/01 19:00 | Drama XYZ | 1GB | third | erasure plan (4/12 18:00) |
| | 97/04/08 18:01 | News CDF | 1GB | fourth | erasure plan (4/12 18:00) |
| playback twice or more | 97/03/18 06:00 | English Conversation 3 | 0.5GB | non-erasable | |
| no playback | 97/03/19 18:00 | Baseball Game ab vs. cd 02 | 2GB | fifth | |
| | 97/04/08 19:00 | Drama XXX | 1GB | sixth | |
| set for recording | 97/04/09 18:00 | Baseball Game ab vs. cd 12 | 3GB | non-erasable | |
| | 97/04/12 18:00 | Baseball Game ab vs. cd 13 | 1.5GB | seventh | |

Fig. 14 , screen present time 1997/04/09 10:00

| broadcast start date and time | program title | program recording capacity | erasure priority | erasure plan (date and time) | manual erasing/setting of release of recording |
|---|---|---|---|---|---|
| 97/03/18 18:00 | Baseball Game ab vs. cd 01 | 2GB | first | erasure plan (4/9 18:00) | ☐ |
| 97/04/01 18:01 | News ABC | 1GB | second | erasure plan (4/9 18:00) | ☐ |
| 97/04/01 19:00 | Drama XYZ | 1GB | non-erasable | | ☐ |
| 97/04/08 18:01 | News CDF | 1GB | third | erasure plan (4/12 18:00) | ☐ |
| 97/03/18 06:00 | English Conversation 3 | 0.5GB | fourth | erasure plan (4/12 18:00) | ☐ |
| 97/03/19 18:00 | Baseball Game ab vs. cd 02 | 2GB | fifth | | ☐ |
| 97/04/08 19:00 | Drama XXX | 1GB | sixth | | ☐ |
| 97/04/09 18:00 | Baseball Game ab vs. cd 12 | 3GB | non-erasable | set for recording | ☐ |
| 97/04/12 18:00 | Baseball Game ab vs. cd 13 | 1.5GB | seventh | set for recording | ☐ | non-erasable · re-writable 3.5GB · usage confirmed · usage planned return    release

Fig. 15

| broadcast start date and time | program title | program recording capacity | erasure priority | erasure plan (date and time) | manual setting of release of erasing/recording |
|---|---|---|---|---|---|
| 97/03/18 18:00 | Baseball Game ab vs. cd 01 | 2GB | first | erasure plan (4/9 18:00) | ☐ |
| 97/04/01 18:01 | News ABC | 1GB | second | erasure plan (4/9 18:00) | ☐ |
| 97/04/01 19:00 | Drama XYZ | 1GB | third | erasure plan (4/12 18:00) | ☐ |
| 97/04/08 18:01 | News CDF | 1GB | fourth | erasure plan (4/12 18:00) | ☐ |
| 97/03/18 06:00 | English Conversation 3 | 0.5GB | non-erasable | | ☐ |
| 97/03/19 18:00 | Baseball Game ab vs. cd 02 | 2GB | fifth | | ☐ |
| 97/04/08 19:00 | Drama XXX | 1GB | sixth | | ☐ |
| 97/04/09 18:00 | Baseball Game ab vs. cd 12 | 3GB | non-erasable | set for recording | ☐ |
| 97/04/12 18:00 | Baseball Game ab vs. cd 13 | 1.5GB | seventh | set for recording | ☐ | present time 1997/04/09 10:10 screen non-erasable | re-writable 3.5GB | usage confirmed | usage planned return  release

Fig. 19 PRIOR ART present time 1999/08/12 20:30    maximum recording time
12 hours    program erasure priority criterion broadcast
start date and time

| channel | program group title | program group recording conditions | program recording condition (recording time) | | |
|---|---|---|---|---|---|
| 12 | News Seven | recording of newest program (1) | recorded (1 hour) 1999/0811/07:00 | recorded (1 hour) 1999/0812/07:00 | |
| 10 | Holiday in Los Angeles | recording of newest program (2) | recorded (2 hour) 1999/0809/21:00 | set for recording (2 hours) 1999/0816/21:00 | |
| 08 | Professional Baseball Game A vs. B | — | recorded (3 hour) 1999/0810/18:00 | | |
| 06 | It Will be Sunny Tomorrow | recording of newest program (3) | recorded (1 hour) 1999/0728/20:00 | recorded (1 hour) 1999/0804/20:00 | recorded (1 hour) 1999/0811/20:00 |
| | | | | | |

Fig. 20 PRIOR ART present time 1999/08/12 20:30  maximum recording time
12 hours  program erasure priority criterion broadcast
start date and time

| channel | program group title | program group recording conditions | program recording condition (recording time) | | |
|---|---|---|---|---|---|
| 12 | News Seven | recording of newest program (1) | recorded (1 hour) 1999/0811/07:00 | recorded (1 hour) 1999/0812/07:00 | |
| 10 | Holiday in Los Angeles | recording of newest program (2) | recorded (2 hour) 1999/0809/21:00 | set for recording (2 hours) 1999/0816/21:00 | |
| 08 | Professional Baseball Game A vs. B | — | recorded (3 hour) 1999/0810/18:00 | | |
| 06 | It Will be Sunny Tomorrow | recording of newest program (3) | recorded (1 hour) 1999/0728/20:00 | recorded (1 hour) 1999/0804/20:00 | recorded (1 hour) 1999/0811/20:00 |
| 12 | Total Solar Eclipse | recording of programs (all) | set for recording (2 hours) 1999/0812/21:00 | set for recording (2 hours) 1999/0813/21:00 | |
| | | | | | |

Fig. 21 PRIOR ART present time 1999/08/12 21:00   maximum recording time
12 hours   program erasure priority criterion broadcast
start date and time

| channel | program group title | program group recording conditions | program recording condition (recording time) | | |
|---|---|---|---|---|---|
| 12 | News Seven | recording of newest program (1) | recorded (1 hour) 1999/0811/07:00 | recorded (1 hour) 1999/0812/07:00 | |
| 10 | Holiday in Los Angeles | recording of newest program (2) | recorded (2 hour) 1999/0809/21:00 | set for recording (2 hours) 1999/0816/21:00 | |
| 08 | Professional Baseball Game A vs. B | — | recorded (3 hour) 1999/0810/18:00 | | |
| 06 | It Will be Sunny Tomorrow | recording of newest program (3) | recorded (1 hour) 1999/0728/20:00 | recorded (1 hour) 1999/0804/20:00 | recorded (1 hour) 1999/0811/20:00 |
| 12 | Total Solar Eclipse | recording of programs (all) | recording (2 hours) 1999/0812/21:00 | set for recording (2 hours) 1999/0813/21:00 | |
| | | | | | |

PROGRAM RECORDING APPARATUS AND PROGRAM RECORDING MEDIUM

CROSS REFERENCE TO RELATED APPLICATIONS

This application is a continuation of U.S. patent application Ser. No. 09/722,643, filed Nov. 28, 2000, naming Hirofumi Wada and Hiroshi Yasuno as co-inventors, which is herein incorporated by reference.

BACKGROUND OF THE INVENTION

1. Field of the Invention

The present invention relates to a program recording apparatus.

2. Related Art of the Invention

First, a structure of a program recording apparatus according to a prior art is described in reference to FIG. 18. Here, FIG. 18 is a configuration view of a program recording apparatus according to a prior art.

The main tuner 10 is a unit receiving an analog broadcasting channel which becomes a recorded image object from an antenna 1.

A sub-tuner 20 is a unit receiving electronic program information provided by a broadcasting station (not shown) from the antenna 1. A data decoding processing part 21 is a unit inputting a signal from the sub-tuner 20 so as to extract and decode electronic program information which multiplexed between vertical retrace line sections of a particular channel.

An image/speech sound encoding processing part 30 is a part for inputting a signal from the main tuner 10 so as to code a digital image/speech sound signal by MPEG, or the like.

A microcontroller 240 wherein a clock and graphic function are built in is a unit which can generate program management information as graphics so as to control the display by a data display part 90 in accordance with the operation of an infrared remote controller 250 by a user. A memory 41 is a unit maintaining work memories required for electronic program information, program management information and the operation of the micro controller 240 wherein a clock and graphics function is built in.

The memory 41 stores electronic program information as shown in FIG. 2. Here, FIG. 2 is a list of electronic program information (appropriately extracted from electronic program information delivered in the week of Jul. 28, 1999) at 20:30 on Aug. 12, 1999.

Electronic program information provided by a broadcasting station (not shown) is formed of seven items: channel, program title, broadcast date and time, genre, program summary, television personalities and series information. The channel is a broadcasting channel of programs. The program title is the title of a program. Broadcast date and time are the date and time when the program broadcast is started and the date and time when the program broadcast is finished. The genre is the category which reflects the contents of the program and is any of "news," "movies," "sports," "drama," "documentary," and "others." The program summary is a summary of the program contents, which is able to be omitted. The television personalities are the people who appear on the program, which are able to be omitted. The series information shows broadcast format of a program, or the like, and is information which is attached in the case that the program consists of a series.

In addition, the memory 41 stores program management information as shown in FIG. 19. Here, FIG. 19 is a list of program management information (recorded programs and programs set for recording are extracted) at 20:30 on Aug. 12, 1999 according to a prior art.

The program management information is formed of seven item of present time, maximum recording time, priority criterion for erasing programs, channel, program group, program group recording criterion and program recording condition (broadcast start date and time and recording time are included).

The present time is current time. The maximum recording time is the maximum value of the total of the program recording time which can be recorded in a recording medium 261. Here the maximum recording time of the recording medium 261 is 12 hours.

The priority criterion for erasing programs is a criterion which is set by a user, which determines the priority with respect to the erasure of data containing the contents of the recorded programs or the programs set for recording and which is the "broadcast starting date and time" (that is to say, the data which contains the contents of the program of which the broadcast starting date and time is earlier are erased according to priority).

The channel is a broadcasting channel of programs. A program group is a series of series information offered by a broadcasting station (not shown). The program group recording criterion is a criterion with respect to the recording of data which contains the contents of programs which is set for each program group and which enables the selection of either of "record the newest x times (x is substituted by a concrete numeral)" or "record every time" for each program group.

The program recording condition is a condition with respect to program recording and is any of "set for recording," "recorded" or "recording." Here, in the column of the program recording condition the starting date and times of program broadcasting and recording time of a program (noted in parentheses) are also noted. Here, the starting date and time of program broadcast in the present column also represents the program title and is noted, for example, as 1999/0812/21:00 in FIG. 20 for the program "Total Solar Eclipse" in FIG. 2. In addition, the recording time of a program is the broadcasting time of the program.

The infrared remote controller 250 is a unit commanding the power source control, channel switching, setting for recording a program, and password input of the recording setter to the micro controller 240 wherein a clock and graphics function are built in through the infrared reception part 51.

The media control part 60 is a part for inputting a signal from the image/speech sound encoding processing part 30 and the micro controller 240 wherein a clock/graphics function are built in so as to carry out writing in and erasing of the data in the recording medium 261.

An image/speech sound decoding processing part 70 is a part for inputting a signal from the medium controlling part 60 so as to decode a digital/image speech sound signal.

An image/speech sound/graphics switching part 80 is a part for inputting a signal from the main tuner 10, the micro controller 240 wherein a clock and graphics function are built in and the image/speech sound decoding processing part 70 so as to switch the outputs of image, speech sound and graphics.

The data display part 90 is a part for inputting a signal from the image/speech sound/graphics switching part 80 so as to render an image and speech sound on a CRT (cathode ray tube) 91.

The operation of the program recording apparatus according to a prior art which has the above described configuration is described in reference to FIGS. 18 to 20.

First, the operations of the program recording apparatus according to a prior art when receiving electronic program information offered by a broadcasting station (not shown) and when forming program management information are described.

The sub-tuner 20 receives, from the antenna 1, the electric wave sent out from a broadcasting station (not shown) extracts data which has electronic program information and carries out signal output to the data decoding processing part 21. The data decoding processing part 21 decodes a signal inputted from the sub-tuner 20 and carries out signal output to the micro controller 240 wherein a clock and graphics function are built in. The micro controller 240 wherein a clock and graphics function are built in inputs a signal from the data decoding processing part 21, which is outputted to the memory 41.

The memory 41 inputs a signal from the micro controller 240 wherein a clock and graphics function are built in and stores electronic program information offered by a broadcasting station. The memory 41 stores electronic program information as shown in FIG. 2 at 20:30 on Aug. 12, 1999.

In addition, the micro controller 240 wherein a clock and graphics function are built in refers to the electronic program information and forms program management information as shown in FIG. 19, which is stored in the memory 41.

Next, the operation of the program recording apparatus according to a prior art when carrying out a setting for recording a program group "Total Solar Eclipse" through the record indication by a user at 20:30 on Aug. 12, 1999 is described.

The infrared remote controller 250 inputs a signal, which commands the recording of the program group "Total Solar Eclipse" according to a record indication by the user, to the micro controller 240 wherein a clock and graphics function are built in through the infrared reception part 51. Here, the record indication contents by the user are that the channel is "12," the program group is "Total Solar Eclipse" and the program group recording criterion is "record every time."

The micro controller 240 wherein a clock and graphics function are built in inputs a signal of the above described record indication from the infrared remote controller 50. In addition, the micro controller 240 wherein a clock and graphics function are built in refers to electronic program information as shown in FIG. 2 based on the input signal and recognizes that the program group "Total Solar Eclipse" comprises a program "Total Solar Eclipse (first)" which is broadcast from 21:00 on Aug. 12, 1999 and of which the recording time is 2 hours, and a program "Total Solar Eclipse (second)" which is broadcast from 21:00 on Aug. 12, 1999 and of which the recording time is 2 hours. The micro controller 240 updates the program management information as shown in FIG. 19 to program management information as shown in FIG. 20. Here, FIG. 20 is a list of updated program management information at 20:30 on Aug. 12, 1999, which is different from FIG. 19 in the point that information with respect to the program group "Total Solar Eclipse" is written in.

The micro controller 240 wherein a clock and graphics function are built in stores that updated program management information in the memory 41.

Next, the operation by the program recording apparatus when recording the program "Total Solar Eclipse (first)" at 21:00 on Aug. 12, 1999 is described.

The micro controller 240 wherein a clock and graphics function are built in refers to program management information as shown in FIG. 20 when it becomes close to 21:00 on Aug. 12, 1999 and recognizes that sufficient empty space exists in the recording medium 261 for recording the program "Total Solar Eclipse (first)" (noted as 1999/0812/21:00 in FIG. 20) of which the recording time is 2 hours because the maximum recording time of the recording medium 261 is 12 hours and the total recording hours of the programs of which the program recording condition is "recorded" is 10 hours at 21:00 on Aug. 12, 1999.

The main tuner 10 receives electric waves sent out from the broadcasting station (not shown) from the antenna 1 when it becomes 21:00 on Aug. 12, 1999, and extracts data which contain the contents of the program "Total Solar Eclipse (first)" so as to carry out signal output to the image/speech sound encoding processing part 30. The image/speech sound encoding processing part 30 encodes a signal inputted from the main tuner 10 and carries out a signal output to the medium control part 60. The medium control part 60 inputs a signal from the image/speech sound encoding processing part 30 and starts the writing in of the data which contains the contents of the program "Total Solar Eclipse (first)" to a recording medium 261. In addition, the medium control part 60 carries out a signal output, of the start of the writing in of the data which contains the contents of the program "Total Solar Eclipse (first)" to the recording medium 261, into the micro controller 40 wherein a clock and graphics function are built in.

The micro controller 40 wherein a clock and graphics function are built in updates program management information as shown in FIG. 21 and stores this in the memory 41. Here, FIG. 21 shows a list of program management information at 21:00 on Aug. 12, 1999 which is different from FIG. 20 in the point that the program recording condition of the program "Total Solar Eclipse (first)" is "recording."

Next, the operation of the program recording apparatus when carrying out recording of the program "Total Solar Eclipse (second)" at 21:00 on Aug. 13, 1999 is described.

The micro controller 240 wherein a clock and graphics function are built in refers to program management information as shown in FIG. 21 when it becomes close to 21:00 on Aug. 13, 1999 and recognizes that sufficient empty space does exist in the recording medium 261 for recording the program "Total Solar Eclipse (second)" (noted as 1999/0813/21:00 in FIG. 20) of which the recording time is 2 hours because the maximum recording time of the recording medium 261 is 12 hours and the total recording hours of the programs of which the program recording condition is "recorded" is 12 hours at 21:00 on Aug. 13, 1999.

As shown in FIG. 20, the program erasure priority criterion is "broadcast start date and time" according to a prior art. Therefore, the data contains the contents of a program of which the broadcast start date and time is earlier are erased according to the priority.

The program of which the broadcast start date and time is the earliest is the program "It Will be Sunny Tomorrow (sixth)" (noted as 1999/0728/20:00 in FIG. 20) and the program of which the broadcast start date and time is the earliest next to this is the program "It Will be Sunny Tomorrow (seventh)" (noted as 1999/0804/20:00 in FIG. 20).

The micro controller 240 wherein a clock and graphics function are built in judges that it is enough to erase the data containing the contents of "It Will be Sunny Tomorrow (sixth)" of which the recording time is 1 hour and the data containing the contents of "It Will be Sunny Tomorrow (seventh)" of which the recording time is 1 hour in order to carry out the recording of the program "Total Solar Eclipse (first)" of which the recording time is 2 hours and carries out a signal output of a command to erase these to the medium control part 60.

The medium control part 60 inputs a command from the micro controller 240 wherein a clock and graphics function are built in and erases the data containing the contents of the program "It Will be Sunny Tomorrow (sixth)" and the data containing the contents of the program "It Will be Sunny Tomorrow (seventh)." The main tuner 10 receives the electric wave sent out from the broadcasting station (not shown) from the antenna 1 at 21:00 on Aug. 12, 1999 and extracts the data containing the contents of the program "Total Solar Eclipse (second)" so as to carry out a signal output to the image/speech sound encoding processing part 30. The image/speech sound encoding processing part 30 encodes a signal inputted from the main tuner 10 and carries out a signal output to the medium control part 60. The medium control part 60 inputs a signal from the image/speech sound encoding processing part 30 and starts the writing in of the data containing the contents of the program "Total Solar Eclipse (second)" to the recording medium 261.

In addition, as has already been described, the program "It Will be Sunny Tomorrow (sixth)" and the program "It Will be Sunny Tomorrow (seventh)" are erased at the time when the program "Total Solar eclipse (second)" is started to be recorded according to the program erasure priority criterion. In the case that the user strongly desires to watch the program "It Will be Sunny Tomorrow (sixth)" and the program "It Will be Sunny Tomorrow (seventh)," that is to say, these are the programs which must not be erased, it is disadvantageous.

In this manner there is the problem that, when sufficient vacant space does not exist at the time of carrying out recording the programs which are judged to have the highest priority of erasure, according to the program erasure priority criterion, are erased, even in the case that they are the programs the user does not desire to be erased.

SUMMARY OF THE INVENTION

Taking such a problem into consideration, the purpose of the present invention is to provide a program recording apparatus which is characterized in that the programs which must not be erased can be appropriately stored.

The 1st invention of the present invention is a program recording apparatus comprising:

a program information input unit inputting program information concerning programs;

a program recording setting unit the setting of the recording of programs;

a recording unit writing in, and erasing, data containing the contents of said programs to and from a recording medium; and a management unit storing program information which is inputted from said program information input unit and recording said programs by said recording unit according to said setting for recording or independent of said setting for recording, wherein said management unit predicts a shortage of vacant space in said recording medium at the point in time when said recording unit carries out the writing in of the data containing the contents of said program, to said recording medium by referring to program management information which includes, at least, said program information, the recording status of said recording medium and recording setting status of said programs and in the case that said vacant space is in shortage, decides programs to be erased when said writing in is carried out among the programs which have already been recorded or which have already been set for recording according to predetermined criteria which include an erasure possibility set prior to erasure of the programs to be erased.

The 2nd invention of the present invention is a program recording apparatus comprising;

a program information input unit inputting program information concerning programs;

a program recording setting unit setting the recording of programs;

a recording unit writing in and erasing data containing the contents of said programs to and from a recording medium; and a management unit storing program information inputted from said program information input unit and for recording said programs by said recording medium according to said setting for recording or independent of said setting for recording, wherein said management unit recognizes a shortage of vacant space in said recording medium by referring to program management information which includes, at least, said program information, recording status of said recording medium and recording setting status of said programs and in the case that said vacant space is in shortage, determines programs to be erased when said writing in is carried out among the programs which have already been recorded or which have already been set for recording according to predetermined criteria which include an erasure possibility set prior to erasure of the programs to be erased.

The 3rd invention of the present invention is a program recording apparatus according to either of 1st or 2nd inventions characterized in that said determination of programs to be erased is carried out by utilizing a criterion concerning said program management information and said erasure possibility.

The 4th invention of the present invention is a program recording apparatus according to 3rd invention characterized in that said determination of the programs to be erased is carried out, by utilizing a history of recording operation which is carried out, by said recording unit.

The 5th invention of the present invention is a program recording apparatus according to either of 1st or 2nd inventions characterized in that said determination of the erasure possibility of the programs or said determination of the programs to be erased is carried out by utilizing any of broadcast start date and time, broadcast time, number of viewings and types of said programs which have been recorded or have been set for recording.

The 6th invention of the present invention is a program recording apparatus according to either of 1st or 2nd inventions characterized in that the criterion concerning said erasure possibility in said predetermined criteria is set for each of the types of said programs.

The 7th invention of the present invention is a program recording apparatus according to either of the 1st or the 2nd inventions characterized in that said predetermined criteria can be freely changed.

The 8th invention of the present invention is a program recording apparatus according to either of the 1st or the 2nd inventions characterized in that said program information is electronic program information.

The 9th invention of the present invention is a program recording apparatus according to the 5th invention characterized in that said types are determined based on the information included in electronic program information and/or the information inputted by the user.

The 10th invention of the present invention is a program recording apparatus according to either of 1st or 2nd inventions characterized in that an indication of cancellation of said setting for recording by the user is necessary in order to cancel the setting for recording of said programs which have been set for recording of which the criterion concerning said erasure possibility is non-erasable.

The 11th invention of the present invention is a program recording medium characterized by the recording of programs and/or data in order to make a computer carry out the entire, or part of, the functions of the entire, or part of, the unit of the present invention according to the 1st or the 2nd invention, and characterized by being readable by computer.

The 12th invention of the present invention is a program recording apparatus according to the 6th invention characterized in that said types are determined based on the information included in electronic program information and/or the information inputted by the user.

BRIEF DESCRIPTION OF THE DRAWINGS

FIG. 2 is a list of electronic program information described in embodiment 1 according to the present invention;

FIG. 3 is a list of program management information described in embodiment 1 according to the present invention;

FIG. 4 is a list of program management information described in embodiment 1 according to the present invention;

FIG. 5 is a list of program management information described in embodiment 1 according to the present invention;

FIG. 6 is a list of program management information described in embodiment 1 according to the present invention;

FIG. 7 is a display diagram of program management information by each recording setter described in embodiment 1 according to the present invention;

FIG. 8 is a display diagram of program management information by each recording setter described in embodiment 1 according to the present invention;

FIG. 10 is a list of program management information described in embodiment 2 according to the present invention;

FIG. 11 is a list of program management information described in embodiment 2 according to the present invention;

FIG. 12 is a list of program erasure priority management information described in embodiment 2 according to the present invention;

FIG. 13 is a list of program erasure priority management information described in embodiment 2 according to the present invention;

FIG. 14 is a schematic diagram of a program management list comprising a program management table and a recording medium which is in a bar graph form as described in embodiment 2 according to the present invention;

FIG. 15 is a schematic diagram of a program management list comprising a program management table and a recording medium which is in a bar graph form as described in embodiment 2 according to the present invention;

FIG. 19 is a list of program management information according to a prior art;

FIG. 20 is a list of program management information according to a prior art; and FIG. 21 is a list of program management information according to a prior art.

DESCRIPTION OF SYMBOLS

Figure 1:
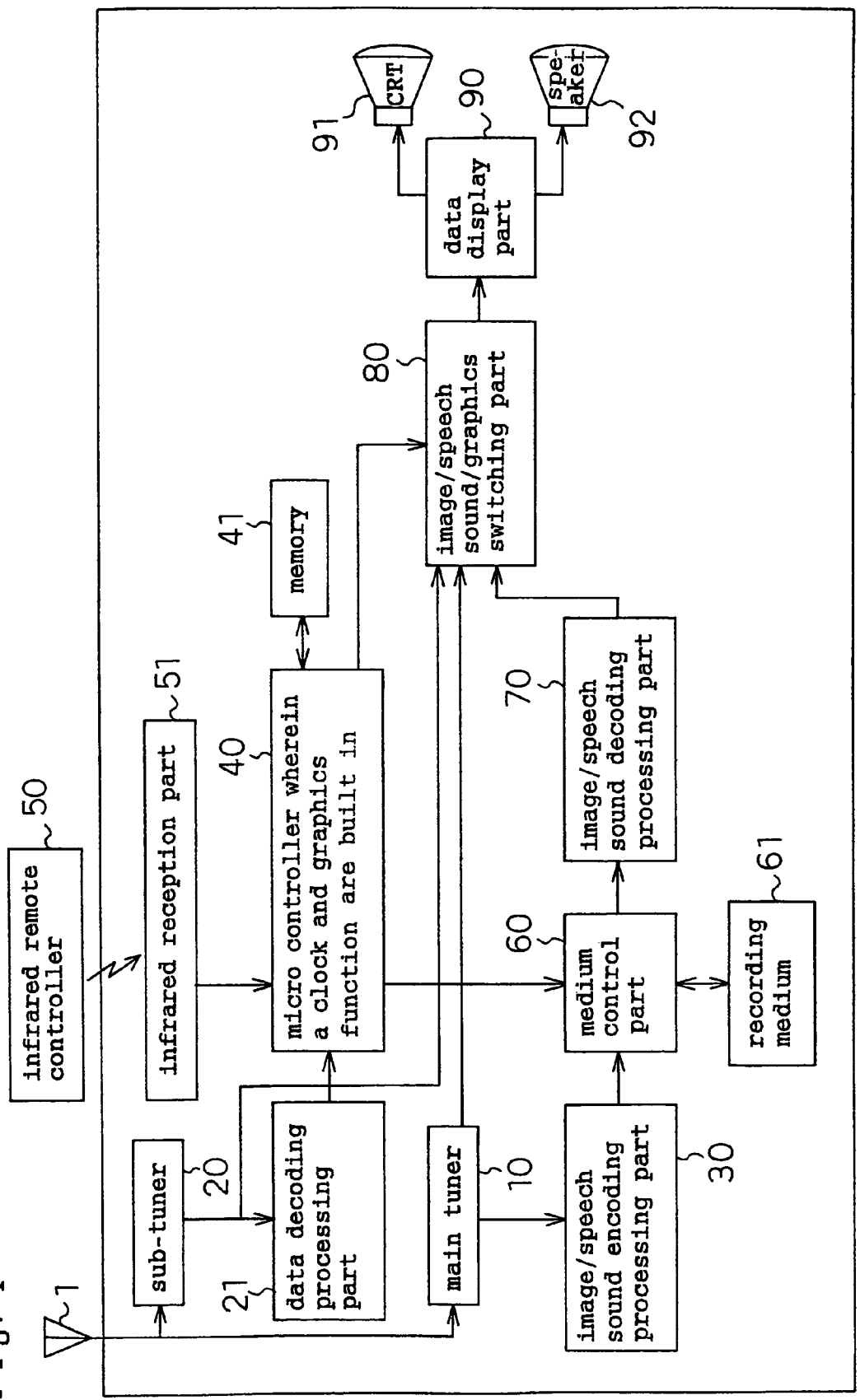
FIG. 1 is a configuration diagram of a program recording apparatus described in embodiment 1 according to the present invention.

1 antenna
10 main tuner
20 sub-tuner
21 data decoding processing part
30 image/speech sound encoding processing part
40 micro controller wherein a clock and graphics function are built in
41 memory
50 infrared remote controller
51 infrared reception part
60 medium control part
61 recording medium
70 image/speech sound decoding processing part
80 image/speech sound/graphics switching part
90 data display part
91 CRT
92 speaker
140 micro controller wherein a clock and graphics function are built in
150 infrared remote controller
161 recording medium
240 micro controller wherein a clock and graphics function are built in
250 infrared remote controller
261 recording medium

PREFERRED EMBODIMENTS OF THE INVENTION

In the following the embodiments according to the present invention are described in reference to the drawings.

Embodiment 1

First, the configuration of a program recording apparatus according to the present embodiment 1 is described in reference to FIG. 1. Here, FIG. 1 is a configuration diagram of a program recording apparatus according to the present embodiment 1.

The main tuner 10 is a unit carrying out a reception of an analog broadcast channel which becomes an object of recording from the antenna 1.

The sub-tuner 20 is a unit carrying out reception of electronic program information offered by a broadcasting station (not shown) from the antenna 1. The data decoding processing part 21 is a unit inputting a signal from the sub-tuner 20 and for carrying out extraction and decoding of electronic program information which is multiplexed between the vertical retrace line sections of a particular channel. Here, the unit formed of the sub-tuner 20 and the data decoding processing part 21 according to the present embodiment 1 corresponds to the program information input unit of the present invention.

The image/speech sound encoding processing part 30 is a part for inputting a signal from the main tuner 10 so as to carry out the encoding of a digital image/speech sound signal by MPEG, or the like (the image/speech sound encoding processing part 30 is not necessary in the case of reception of digital broadcasting).

The micro controller 40 wherein a clock and graphics function are built in is a unit predicting the shortage of vacant space of the recording medium 61 at the time of carrying out the writing in of the data containing the contents of a program which is set to be recorded by the medium control part 60 at the time when the program is set to be recorded by referring to program management information which includes, at least, program information, recording condition of the recording medium 61 and the setting condition for the recording of the programs. In addition, the micro controller 40 wherein a clock and graphics function are built in is a unit determining, in the case that the vacant space of the recording medium 61 is in the shortage state, the programs to be erased at the time when the writing in is carried out among the programs which have already been recorded or the programs which have already been set for recording according to a predetermined criterion including the criterion concerning the erasure possibility at the time when the writing in of the programs is carried out.

Here, the micro controller 40 wherein a clock and graphics function are built in is a unit which can classify programs into program groups by using electronic program information, information inputted from a infrared remote controller 50 through the record indication by the user and time information. In addition, the micro controller 40 wherein a clock and graphics function are built in is, as described below, a unit generating program management information as a graphic which can control the display by the data display part 90 according to the operation of the infrared remote controller 50 by the user.

The memory 41 is a unit storing electronic program information, program management information and a work memory which is necessary for the operation of the micro controller 40 wherein a clock and graphics function are built in.

Here, a unit formed of the micro controller 40 wherein a clock and graphics function are built in and the memory 41 according to the present Embodiment 1 corresponds to the management unit according to the present invention.

In addition, the memory 41 stores electronic program information as shown in FIG. 2 and program management information as shown in FIG. 3. Here, FIG. 3 is a list of program management information at 20:30 on Aug. 12, 1999 which is described in the embodiment of the present invention, wherein the maximum recording time of the recording medium 61 is 12 hours and the total recording time of the programs of which the program recording conditions are "recorded" at 20:30 on Aug. 12, 1999 is 10 hours. In addition, the program "Holiday in Los Angeles (Part 26 Informer's Report)" (noted as 1999/0816/21:00 in FIG. 3) of which the recording time is 2 hours is set for recording in the vacant space for 2 hours. As described below, though the program recording condition of the program "Holiday in Los Angeles (Part 26 Informer's Report)" is "recording," the erasure possibility criterion of this program group indicates "non-erase" and, therefore, the recording setting for the program "Holiday in Los Angeles (Part 26 Informer's Report)" cannot be cancelled without the indication of cancellation of the setting for recording by the user.

The program management information consists of eleven items which are present time, maximum recording time, program erasure priority criterion, channel, program group, program group recording criterion, erasure possibility criterion of a program group, recording setter, a password, program recording condition (including broadcast start date and time and recording time) and total usage time.

Here, the channel corresponds to a part of program information in the present invention. And, the program group corresponds to a part of the program information in the present invention. In addition, the program recording condition corresponds to a part of the recording condition of the above described recording medium and the above described setting condition for the recording of the programs in the present invention. And, the total usage time corresponds to a part of the recording condition of the recording medium in the present invention. In addition, the erasure possibility criterion of a program group in the present invention need not be included in the program management information as in the present embodiment 1 but, rather, may be managed separately from the program management information.

The main items which form the program management information are described.

The maximum recording time is the maximum value of the total recording time of the programs that can be recorded in the recording medium 61. Here, the maximum recording time of the recording medium 61 is 12 hours.

The erasure possibility criterion of a program is a criterion, set by the user, for determining the priority of the erasure of the data containing the contents of the programs which have been recorded or set for recording, and the erasure possibility criterion of a program according to the present embodiment 1 is "broadcast start date and time" (that is to say, the data containing the contents of programs of which the broadcast start date and time is earlier are erased according to priority). Here, the erasure possibility criterion of a program according to the present embodiment 1 corresponds to a predetermined criterion of the present invention by being combined with the program group erasure possibility criterion, which is described later.

The channel is a broadcasting channel of a program. The program group is a series in the series information of the electronic program information which is offered by the broadcasting station (not shown). Here, the program group in the present embodiment 1 corresponds to the types of the programs according to the present invention.

The program group recording criterion is a criterion, set for each program group, concerning the recording of the data containing the contents of programs and it is possible to select either "record the newest x times (x is substituted with a concrete numeral)" or "record every time" for each program group.

The erasure possibility criterion of a program group is a criterion, set for each program group, concerning whether or not the data containing the contents of the programs must be erased and is either of "erasable" or "non-erasable." Here, the erasure possibility criterion of a program group in the present Embodiment 1 corresponds to the program group erasure possibility criterion according to the present invention, and is an item which is not included in the program management information according to a prior art.

The recording setter is a registered name of a recording setter which is set by the recording setter and is an item which is not included in the program management information according to a prior art. The password indicates whether or not a personal identification number of the recording setter exists, which is set by the recording setter and is an item which is not included in the program management information according to a prior art.

The program recording condition is a condition concerning the recording of the programs and is any of "set for recording," "recorded" and "recording." Here, in the column of the program recording condition the broadcast start date and time of the programs and the recording time (noted in parentheses) of the programs are also described. Here, the broadcast start date and time of the programs in this column also represent program titles and, for example, the program "Total Solar Eclipse (first)" in FIG. 2 is noted as 1999/0812/21:00 in FIG. 4. The total usage time is the total of the recording time of the programs which have been recorded or set for recording in a program group.

The infrared remote controller 50 is a unit commanding the power source control, channel switching, setting for recording a program, password input of the recording setter, or the like, to the micro controller 40 wherein a clock and graphics function are built in through the infrared reception part 51. Here, a unit which consists of the infrared remote controller 50 and the infrared reception part 51 in the present embodiment 1 corresponds to a program recording setting unit according to the present invention.

The medium control part 60 is a part for inputting a signal from the image/speech sound encoding processing part 30 and the micro controller 40 wherein a clock and graphics function are built in so as to carry out the writing in and erasure of the data in the recording medium 61. Here, the medium control part 60 in the present embodiment 1 corresponds to a recording unit according to the present invention.

The image/speech sound decoding processing part 70 is a part for inputting a signal from the medium control part 60 so as to carry out the decoding of a digital image/speech sound signal.

The image/speech sound/graphics switching part 80 is a part for inputting a signal from the main tuner 10, the micro controller 40 wherein a clock and graphics function are built in and the image/speech sound decoding processing part 70 so as to carry out output switching between image, speech sound and graphics.

The data display part 90 is a part for inputting a signal from the image/speech sound/graphics switching part 80 so as to render image and speech sound on a CRT 91 and a speaker 92.

The operation of a program recording apparatus according to the present embodiment 1 which has such a configuration as the above is described in reference to FIGS. 1 to 8.

First, reception of electronic program information which is provided by a broadcasting station (not shown) and the operation of carrying out the formation of program management information in the program recording apparatus according to the present embodiment 1 are described. Here, the electronic program information according to the present embodiment 1 is shown in FIG. 2.

The sub-tuner 20 receives electric waves sent out from the broadcasting station (not shown) at the antenna 1 and extracts data which has the electronic program information so as to carry out a signal output to the data decoding processing part 21. The data decoding processing part 21 decodes a signal inputted from the sub-tuner 20 and carries out a signal output to the micro controller 40 wherein a clock and graphics function are built in. The micro controller 40 wherein a clock and graphics function are built in inputs a signal from the data decoding processing part 21 and outputs this to the memory 41.

The memory 41 inputs a signal from the micro controller 40 wherein a clock and graphics function are built in and stores the electronic program information as shown in FIG. 2.

In addition, the micro controller 40 wherein a clock and graphics function are built in refers to the electronic program information, the recording condition of the recording medium 61 and the condition of the programs set for recording and forms the program management information as shown in FIG. 3 so as to output this into the memory 41.

The memory 41 inputs a signal of the program management information from micro controller 40 wherein a clock and graphics function are built in, which is stored.

Next, the operation of the program recording apparatus according to the present embodiment 1 when carrying out the recording setting of the program group "Total Solar Eclipse" according to the record indication by the recording setter A at 20:30 on Aug. 12, 1999 is described in detail.

The infrared remote controller 50 inputs a signal which commands the recording of the program group "Total Solar Eclipse" according to the record indication by the recording setter A into the micro controller 40 wherein a clock and graphics function are built in through the infrared reception part 51. Here, the contents of the record indication by the recording setter A are that the channel is "12," the program group is "Total Solar Eclipse," the program group recording criterion is "record every time," the program group erasure possibility criterion is "non-erasable," the recording setter is "A" and the password is "nil."

The micro controller 40 wherein a clock and graphics function are built in inputs a signal of the above described record indication from the infrared remote controller 50.

The micro controller 40 wherein a clock and graphics function are built in refers to the electronic program information as shown in FIG. 2 based on the input signal and recognizes that the program group "Total Solar Eclipse" consists of a program "Total Solar Eclipse (first)" which is broadcast from 21:00 on Aug. 12, 1999 and of which the recording time is 2 hours and a program "Total Solar Eclipse (second)" which is broadcast from 21:00 on Aug. 13, 1999 and of which the recording time is 2 hours and then refers to the program management information as shown in FIG. 3 so as to make judgments as follows.

The micro controller 40 wherein a clock and graphics function are built in recognizes that sufficient vacant space exists in the recording medium 61 at the time when the writing in of the data containing the contents of the program "Total Solar Eclipse (first)" of which the recording time is 2 hours is carried out (that is to say, at 21:00 on Aug. 12, 1999), because the maximum recording time of the recording medium 61 is 12 hours and the total recording time of the programs of which the program recording conditions are "recorded" at 21:00 on Aug. 12, 1999 is 10 hours. Accordingly, the micro controller 40 wherein a clock and graphics function are built in judges that the data containing the contents of the program "Total Solar Eclipse (first)" may be written in in the vacant space for 2 hours.

The micro controller 40 wherein a clock and graphics function are built in recognizes that sufficient vacant space does not exist in the recording medium 61 at the time when the writing in of the data containing the contents of the program "Total Solar Eclipse (second)" of which the recording time is 2 hours is carried out (that is to say, at 21:00 on Aug. 13, 1999), because the maximum recording time of the recording medium 61 is 12 hours and the total recording time of the programs of which the program recording conditions are "recorded" at 21:00 on Aug. 13, 1999 is 12 hours. Accordingly, the micro controller 40 wherein a clock and graphics function are built in judges that the data containing the contents of the program which has been recorded at 21:00 on Aug. 13, 1999 must be erased in order to carry out the recording of the program "Total Solar Eclipse (second)" according to the record indication by the recording setter A.

As described above the program erasure priority criterion in the present embodiment 1 is a "broadcast start date and time." Accordingly, among the data of which the program group erasure possibility criterion is "erasable" the data containing the program contents of which the broadcast start date and time is the earliest is erased according to the priority.

The program of which the broadcast start date and time is the earliest is the program "It Will be Sunny Tomorrow (sixth)" (which is noted as 1999/0728/20:00 in FIG. 3) and the program of which the broadcast start date and time is the earliest next to this is the program "It Will be Sunny Tomorrow (seventh)" (which is noted as 1999/0804/20:00 in FIG. 3). However, both of those programs belong to the program group "It Will be Sunny Tomorrow" and the program group erasure possibility criterion which is set for the program group "It Will be Sunny Tomorrow" is "non-erasable."

The program of which the broadcast start date and time is the third earliest is the program "Holiday in Los Angeles (Part 25 Secret)" (which is noted as 1999/0809/21:00 in FIG. 3). However, this program belongs to the program group "Holiday in Los Angeles" and the program group erasure possibility criterion which is set for the program group "Holiday in Los Angeles" is "non-erasable."

The micro controller 40 wherein a clock and graphics function are built in judges that the program "Professional Baseball A vs. B (the eighth game)" (which is noted as 1999/0810/18:00 in FIG. 3) of which the recording time is 3 hours must be erased and the data containing the contents of the program "Total Solar Eclipse (second)" of which the recording time is 2 hours may be written in in a part of the vacant space, which is generated by the erasure of the above program, for 3 hours.

The micro controller 40 wherein a clock and graphics function are built in recognizes that sufficient vacant space does not exist in the recording medium 61 at the time when the writing in of the data containing the contents of the program "Holiday in Los Angeles (Part 26 Informer's Report)" (which is noted as 1999/0816/21:00 in FIG. 3), of which the recording time is 2 hours, into the recording medium 61 is carried out (that is to say, at 21:00 on Aug. 16, 1999), because the maximum recording time of the recording medium 61 is 12 hours and the total recording time of the programs of which the program recording conditions are "recorded" at 21:00 on Aug. 16, 1999 is 11 hours.

The micro controller 40 wherein a clock and graphics function are built in judges that the program "News Seven (August 11)" (which is noted as 1999/0811/07:00 in FIG. 3) of which the recording time is 1 hour must be erased at 21:00 on Aug. 16, 1999 and the data containing the contents of the program "Holiday in Los Angeles (Part 26 Informer's Report)" of which the recording time is 2 hours may be written in in the vacant space for 2 hours in total, 1 hour of which is generated by the erasure of the above program and 1 hour of which previously existed without carrying out erasure.

The micro controller 40 wherein a clock and graphics function are built in accepts the recording of the program group "Total Solar Eclipse" based on the above described judgment as the record indication by the recording setter A and updates the program management information as shown in FIG. 3 into the program management information as shown in FIG. 4. Here, FIG. 4 is a list of updated program management information at 20:30 on Aug. 12, 1999 which is described in the embodiments of the present invention, which is different from FIG. 3 in the point that information concerning the program group "Total Solar Eclipse," is written in. Here, the program "Professional Baseball A vs. B (the eighth game)" (which is noted as 1999/0810/18:00 in FIG. 4) and the program "News Seven (August 11)" (which is noted as 1999/0811/07:00 in FIG. 4) which are the programs intended to be erased have x marks attached.

The micro controller 40 wherein a clock and graphics function are built in stores the updated program management information in the memory 41. And the microcontroller 40 wherein a clock and graphics function are built in commands the speaker 92 to output the speech sound display "setting for recording is complete."

The speaker 92 inputs the command from the micro controller 40 wherein a clock and graphics function are built in and outputs the speech sound display "setting for recording is complete."

Next, the operation of the program recording apparatus in the present embodiment 1 when carrying out the selection change of the programs intended to be erased according to the manual operation by the recording setter A at 20:40 on Aug. 12, 1999 is described in detail.

The infrared remote controller 50 outputs a signal of a command to display the management information as shown in FIG. 7 on the CRT 91 through the infrared reception part 51 according to the indication by the recording setter A. Here, FIG. 7 is a display diagram of the program management information which is simplified for each recording setter at 20:40 on Aug. 12, 1999 which is described in the embodiments of the present invention (here the program management information concerning the program group "Professional Baseball A vs. B," for which a password has been set, is not displayed without inputting a password of the recording setter A).

The infrared remote controller 50 follows the indication by the recording setter A and designates the program "News Seven (August 12)" (which is noted as 1999/0812/07:00 in FIG. 7) instead of the program "News Seven (August 11)" (which is noted as 1999/0811/07:00 in FIG. 7) as a program which is erased at 21:00 on Aug. 16, 1999 in order to record the program "Holiday in Los Angeles (Part 26 Informer's Report)."

The micro controller 40 wherein a clock and graphics function are built in judges that it is sufficient for the program "News Seven (August 12)" (which is noted as 1999/0812/07:00 in FIG. 7) of which the recording time is 1 hour to be designated instead of the program "News Seven (August 11)" (which is noted as 1999/0811/07:00 in FIG. 7) of which the recording time is 1 hour as a program which is erased for recording the program "Holiday in Los Angeles (Part 26 Informer's Report)."

The micro controller 40 wherein a clock and graphics function are built in updates the program management information simplified for each recording setter as shown in FIG. 7 into the program management information simplified for each recording setter as shown in FIG. 8. Here, FIG. 8 this display of the program management information simplified for each recording setter at 20:41 on Aug. 12, 1999 which is described in the present embodiment 1. In addition, the micro controller 40 wherein a clock and graphics function are built in updates the program management information as shown in FIG. 4 into the program management information as shown in FIG. 5. Here, FIG. 5 is a display of the program management information at 20:41 on Aug. 12, 1999 which is described in the present embodiment 1 wherein the program "News Seven (August 12)" (which is noted as 1999/0812/07:00 in FIG. 7) is designated instead of the program "News Seven (August 11)" (which is noted as 1999/0811/07:00 in FIG. 7) as a program which is erased for recording the program "Holiday in Los Angeles (Part 26 Informer's Report)."

The micro controller 40 wherein a clock and graphics function are built in stores the updated program management information in the memory 41. In addition, the micro controller 40 wherein a clock and graphics function are built in commands the speaker 92 to output the speech sound display "update of the setting for recording is complete."

The speaker 92 inputs the command from the micro controller 40 wherein a clock and graphics function are built in and outputs the speech sound display "update of the setting for recording is complete."

Next, the operation of the program recording apparatus in the present embodiment 1 when carrying out recording of the program "Total Solar Eclipse (second)" at 21:00 on Aug. 13, 1999.

The micro controller 40 wherein a clock and graphics function are built in refers to the program management information (not shown) at 21:00 on Aug. 13, 1999 when that time approaches and outputs a command signal, to the medium control part 60, to erase the data containing the contents of the program "Professional Baseball A vs. B (the eighth game)" (which is noted as 1999/0810/18:00 in FIG. 5 for example).

The medium control part 60 inputs the command from the micro controller 40 wherein a clock and graphics function are built in and erases the data containing the contents of the program "Professional Baseball A vs. B (the eighth game)."

The main tuner 10 receives the electric wave sent out from the broadcasting station (not shown) when it becomes 21:00 on Aug. 12, 1999 at the antenna 1 and extracts the data containing the contents of the program "Total Solar Eclipse (second)" so as to carry out a signal output to the image/speech sound encoding processing part 30.

The image/speech sound encoding processing part 30 encodes the signal inputted from the main tuner 10 and carries out a signal output to the medium control part 60.

The medium control part 60 inputs a signal from the image/speech sound encoding processing part 30 and starts the writing in of the data containing the contents of the program "Total Solar Eclipse (second)" to the recording medium 61. In addition, the medium control part 60 outputs, to the micro controller 40 wherein a clock and graphics function are built in, a signal for starting the writing in of the data containing the contents of the program "Total Solar Eclipse (second)" to the recording medium 61.

The micro controller 40 wherein a clock and graphics function are built in updates the program management information as shown in FIG. 6, and stores this in the memory 41. Here, FIG. 6 is a list of the program management information at 21:00 on Aug. 13, 1999 which is described in the present embodiments wherein the program recording condition of the program "Total Solar Eclipse (first)" is already "recorded" while the program recording condition of the program "Total Solar Eclipse (second)" is "recording." In addition, the data containing the contents of the program "Professional Baseball A vs. B (the eighth game)" has been erased.

Here, though the program group recording criterion, the program group erasure possibility criterion, the recording setter and the password in the present embodiment 1 have not been changed after being set as in the above described embodiments, they may be arbitrarily changed at any time without limiting the invention to the above.

In addition, in the case that the recording medium of the present invention carries out the recording of a program, which belongs to a program group consisting of the programs which are comprehensively set for recording, the recording may be carried out by erasing the programs which have already been recorded prior to carrying out this recording and which belong to the program group. For example, under the same circumstances as in the above described embodiment 1, there may occur a case wherein the comprehensive setting for the recording of the program group "Total Solar Eclipse" is carried out by erasing the recording of the program "Total Solar Eclipse (first)" in order to carry out the recording of the program "Total Solar Eclipse (second)." In this case the recording of the program "Total Solar Eclipse (second)," of which the broadcast starts at 21:00 on Aug. 13, 1999, is carried out by erasing the program "Total Solar Eclipse (first)" and, therefore, the erasure of the program "Professional Baseball A vs. B (the eighth game)" is not carried out at this point in time. Here, when the recording of the program "Total Solar Eclipse (second)" is complete the vacant space of the recording medium 61 is eliminated. Accordingly, in order to carry out the recording of the program "Holiday in Los Angeles (Part 26 Informer's Report)," of which the broadcast starts at 21:00 on Aug. 16, 1999, the erasure of the program "Professional Baseball A vs. B (the eighth game)" is carried out. Here, the recording time of the program "Holiday in Los Angeles (Part 26 Informer's Report)" is 2 hours while the recording time of the program "Professional Baseball A vs. B (the eighth game)" is 3 hours and, therefore, when the recording of the program "Holiday in Los Angeles (Part 26 Informer's Report)" is complete the vacant space of 1 hour is created in the recording medium 61. In addition, in this case, the erasure of the program "News Seven (August 12)" is not carried out.

In this way, the program which in non-erasable can be appropriately stored.

Embodiment 2

Figure 9:
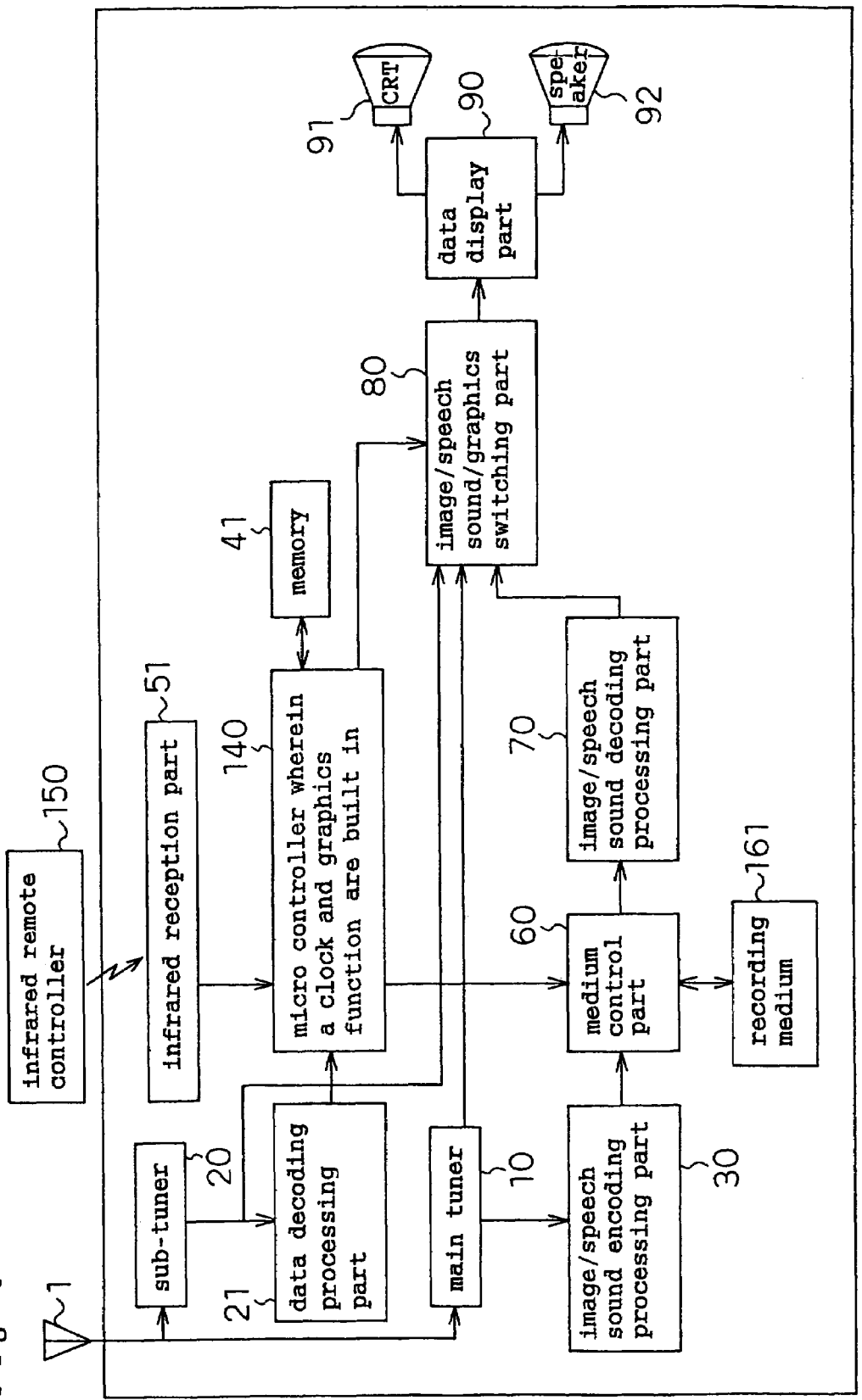
FIG. 9 is a configuration diagram of a program recording apparatus described in embodiment 2 according to the present invention.

At first the configuration of a program recording apparatus according to the present embodiment 2 is described in reference to FIG. 9. Here, FIG. 9 is a configuration view of the program recording apparatus in the present embodiment 2.

The micro controller 140 wherein a clock and graphics function are built in is a unit to predict, at a point in time when a program is set for recording, the shortage of the vacant space in the recording medium 161 at the time when the medium control part 60 carries out the writing in, of the data containing the contents of the program which has been set to be recorded, to the recording medium 161 by referring to, at least, the program group information, the recording condition of the recording medium 161 and the program management information which includes the setting condition for the recording of the programs. In addition, the micro controller 140 wherein a clock and graphics function are built in is a unit determining the programs which should be erased at the point in time of carrying out the recording among the programs which have already been recorded and which have already been set for recording according to a predetermined criterion including a criterion concerning erasure possibility at the point in time of the carrying out of the above described writing in of the program in the case that the vacant space of the recording medium 161 runs short.

Here, the micro controller 140 wherein a clock and graphics function are built in is a unit which can produce the program management information as a graphic as described below and which can control the display through the data display part 90 according to the operation of the infrared remote controller 150 by the user. Here, the unit formed of the micro controller 140 wherein a clock and graphics function are built in and the memory 41 in the present embodiment 2 correspond to the management unit of the present invention.

The memory 41 stores the electronic program information (not shown) provided by the broadcasting station and the program management information as shown in FIG. 10 at 10:00 on Apr. 9, 1997.

The program management information is formed of seven items: present time, maximum recording capacity, program title and channel, program recording capacity (that is to say, size of the data containing the contents of a program), broadcast start date and time, number of playbacks/dubbings and erasure possibility. Here, the erasure possibility in the present embodiment 2 is either of "erasable" or "non-erasable" based on the indication by the user and this corresponds to the criterion concerning the erasure possibility of the present invention. In addition, the program recording capacity in the present embodiment 2 corresponds to the recording condition of the recording medium and the setting condition for the recording of the programs, of the present invention. In addition, the program title, channel and broadcast start date and time correspond to part of the program information in the present invention.

In addition, the program management information contains the already recorded capacity, vacant capacity, re-writable capacity, non-erasable capacity, capacity set for recording and capacity which is able to be set for recording. The already recorded capacity is the total sum of the capacity which already contains recorded programs. The vacant capacity is the difference between the maximum recording capacity and the already recorded capacity. The re-writable capacity is the total of the capacity of the recorded programs wherein the erasure possibility is "erasable." The non-erasable capacity is the sum of the capacity of the recorded programs wherein the erasure possibility is "non-erasable." The capacity which is set for recording is the sum of the capacity of the programs which are set for recording. The capacity which is able to be set for recording is the difference between the re-writable capacity and the capacity which is set for recording.

In addition, the memory 41 stores program erasure priority management information as shown in FIG. 12 at 10:00 on Apr. 9, 1997.

The program erasure priority management information is formed of seven items: present time, maximum recording capacity, program erasure priority criterion (formed of the two items of playback number and broadcast start date and time), program title, program recording capacity, erasure priority and erasure plan.

The program erasure priority criterion is the combination of the playback number and the broadcast start date and time. That is to say, the programs are categorized into any of the groups: "playback once," "playback twice or more," "no playback" and "set for recording" according to the playback number and the recording condition while the erasure priority becomes higher in the order of "playback one," "playback twice or more," "no playback" and "set for recording." In addition, within the same group the earlier the broadcast start date and time the higher the erasure priority given to the program. Here, no erasure priority is given to a program of which the above described user indication of erasure possibility is "non-erasable." Accordingly, though the problem "Baseball ab vs. cd 12" is categorized in the group "set for recording," the setting for the recording of the program "Baseball ab vs. cd 12" is not cancelled without the indication of cancellation of the setting for the recording by the user since the indication of the erasure possibility is set as "non-erasable."

Here, the program erasure priority criterion in the present embodiment 2 corresponds to a predetermined criterion of the present invention by being combined with the above described indication of the erasure possibility by the user.

The infrared remote controller 150 is a unit commanding the setting for the recording of the programs, replay or dubbing of the programs, or the like, to the micro controller 140 wherein a clock and graphics function are built in through the infrared reception part 51. Here, the unit formed of the infrared remote controller 150 and the infrared reception part 51 according to the present embodiment 2 corresponds to the program recording setting unit of the present invention.

The medium control part 60 is a part which inputs a signal from the image/speech sound encoding processing part 30 and the micro controller 40 wherein a clock and graphics function are built in and carries out the writing in and the erasure of the data in the recording medium 161 of which the maximum recording capacity is 8.5 GB. Here, the medium control part 60 according to the present embodiment 2 corresponds to the recording unit of the present invention.

The data display part 90 is a part which inputs a signal from the image/speech sound decoding processing part 70 and renders the image and the speech sound on the CRT 91 and the speaker 92.

The operation of the program recording apparatus according to the present embodiment 2 which has such a configuration as in the above is described in reference to FIGS. 9 to 17.

Figure 17:
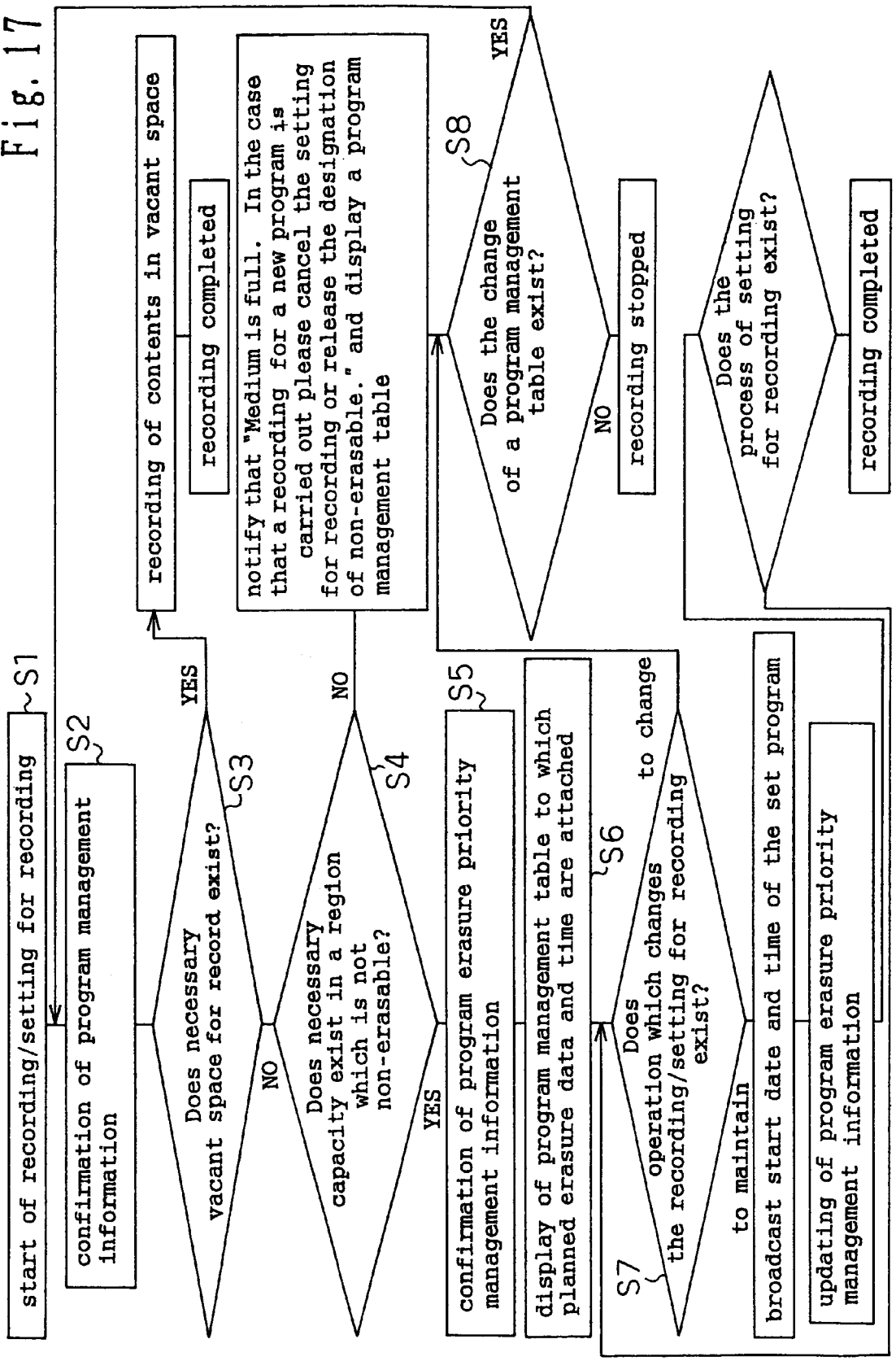
FIG. 17 is a flow chart which describes the operation of the program recording apparatus described in embodiment 2 according to the present invention.
Figure 18:
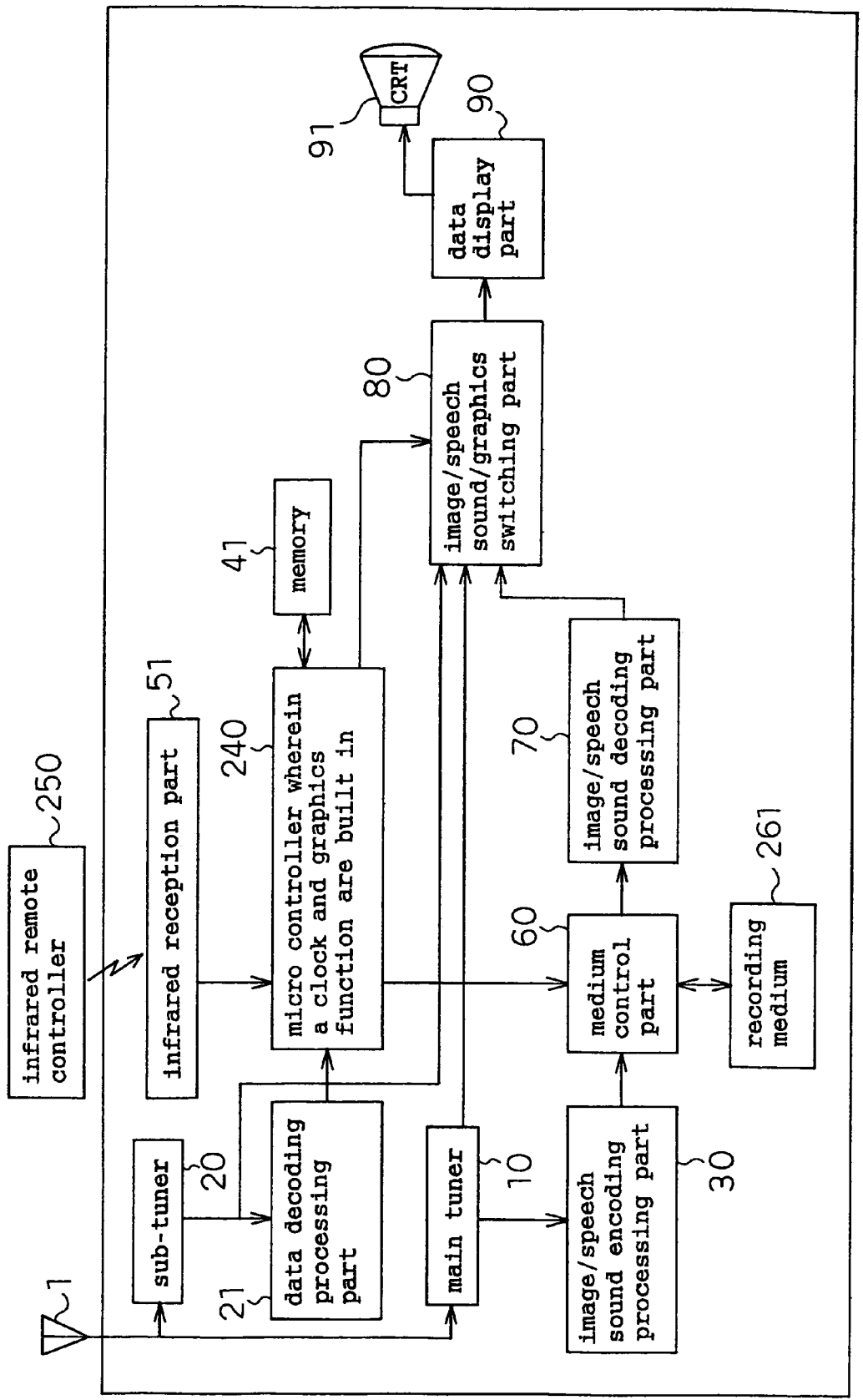
FIG. 18 is a configuration diagram of a program recording apparatus according to a prior art.

The operation of the program recording apparatus in the present embodiment 2 when carrying out the setting for recording the program "Baseball ab vs. cd 13" at 10:00 on Apr. 10, 1997 is described in detail in reference to FIG. 17. Here, FIG. 17 is a flow chart for describing the operation of the program recording apparatus according to the present embodiment 2 when carrying out the setting for recording.

The infrared remote controller 150 inputs a command signal to record the program "Baseball ab vs. cd 13" to the micro controller 140 wherein a clock and graphics function are built in through the infrared reception part 51 according to the recording indication by the user. Here, the contents of the recording indication by the recording setter A are as follows: the channel is "6," the program title is "Baseball ab vs. cd 13" and the erasure possibility is "non-erasable."

The micro controller 140 wherein a clock and graphics function are built in inputs a signal of the above described recording indication from the infrared remote controller 150 (S1).

The micro controller 140 wherein a clock and graphics function are built in refers to the above described electronic program information and recognizes that the program "Baseball ab vs. cd 13" is a program which is broadcast from 18:00 on Apr. 12, 1997 and the program recording capacity is 1.5 GB. In addition, the micro controller 140 wherein a clock and graphics function are built in refers to the program management information as shown in FIG. 10 and recognizes that sufficient vacant space does not exist in the recording medium 161 at the point in time (that is to say, at 18:00 on Apr. 12, 1997) of the carrying out of the writing in, to the recording medium 161, of the data containing the contents of the program "Baseball ab vs. cd 13." Because the maximum recording capacity of the recording medium 161 is 8.5 GB and the sum of the program recording capacity of the programs which have been recorded at 18:00 on Apr. 12, 1997 is 8.5 GB and, therefore, it cannot be said that sufficient vacant space does not exist for recording the program "Baseball ab vs. cd 13" of which the program recording capacity is 1.5 GB (S2, S3).

The micro controller 140 wherein a clock and graphics function are built in refers to the program erasure priority management information as shown in FIG. 12 and judges that the program "News CDF" of which the program recording capacity is 1 GB and the program "English Conversation 3" of which the program recording capacity is 0.5 GB are erased at 18:00 on Apr. 12, 1997 so that the recording of the program "Baseball ab vs. cd 13" of which the program recording capacity is 1.5 GB may be carried out (S4, S5).

The micro controller 40 wherein a clock and graphics function are built in outputs a command signal to display the program management list as shown in FIG. 14 on the CRT 91 to the data display part 90 through the image/speech sound graphics switching part 80 in order to notify this judgment to user. Here, FIG. 14 is a schematic diagram of the program management table which is described in the present embodiment 2 and of the program management list comprising the recording medium 161 which is made into a bar graph so that the usage condition can be easily be seen.

Here, the program management table consists of seven items: present time, broadcast start date and time, program title, program recording capacity, erasure priority (including indication of a program for which "non-erasable" is designated), erasure plan and check box for manual setting of erasure/recording release. In addition, in the lower part of the program management table, a button which has a "return" symbol to call back the immediately preceding screen and a button which has a "release" symbol for confirming the manual erasure/recording release through the GUI utilization are displayed.

The data display part 90 inputs a signal from the micro controller 40 wherein a clock and graphics function are built in and displays a program management table as shown in FIG. 14 on the screen of the CRT 91 (S6).

The infrared remote controller 150 designates a program "Drama XYZ" as a program which is to be erased at 18:00 on Aug. 12, 1997 according to the indication of the user. In addition, the infrared remote controller 150 changes the condition of erasure possibility of the program "English Conversation 3" from "erasable" to "non-erasable" according to the indication of the user (S7).

The micro controller 140 wherein a clock and graphics function are built in inputs a signal from the infrared remote controller 150 and updates the program management list as shown in FIG. 14 to a program management list as shown in FIG. 15 (S8). Here, FIG. 15 is a schematic diagram of a program management list which comprises the updated program management table and a recording medium 161 which is shown in bar graph form so that the utilization conditions can be easily seen.

The micro controller 140 wherein a clock and graphics function are built in judges that it is sufficient for the program "News CDF," of which the program recording capacity is 1 GB, and the program "Drama XYZ," of which the program recording capacity is 1 GB, to be erased at the point in time when the writing in of the data containing the contents of the program "Baseball ab vs. cd 13" of which the program recording capacity is 1.5 GB to the recording medium 161 is carried out (S2, S3, S4, S5, S6, S7).

The micro controller 140 wherein a clock and graphics function are built in accepts the recording of the program "Baseball Game ab vs. cd 13" as the recording indication of the user based on the above described judgment and updates the program management information as shown in FIG. 10 to the program management information as shown in FIG. 11. Here, FIG. 11 is a display diagram of the program management information at 10:10 on Apr. 9, 1997 which is described in the embodiment of the present invention. In addition, the micro controller 40 wherein a clock and graphics function are built in updates the program erasure priority management information as shown in FIG. 12 to the program erasure priority management information as shown in FIG. 13. Here, FIG. 13 is a display diagram of the program erasure priority management information at 10:10 on Apr. 9, 1997 which is described in the embodiment of the present invention.

The micro controller 40 wherein a clock and graphics function are built in stores the program management information as shown in FIG. 11 and the program erasure priority management information as shown in FIG. 13 in the memory 41. And, the micro controller 40 wherein a clock and graphics function are built in commands the output of the speech sound indication "setting for recording is complete" to the speaker 92.

Figure 16:
FIG. 16 is a schematic diagram of a recording medium which is in a bar graph form as described in embodiment 2 according to the present invention.

The speaker 92 inputs the command from the micro controller 40 wherein a clock and graphics function are built in and outputs the speech sound indication "setting for recording is complete." Here, a considerable display area of the screen is necessary for displaying the program management table as shown in FIG. 15 and, therefore, only the display of the recording medium 161 which is shown in a bar graph form may be carried out as shown in FIG. 16 in accordance with the wish of the user. In addition, the recording capacity of the recording medium 161 which is in a bar graph form may be displayed by assumption value of the utilization time (for example, 1.5 hours in high quality screen mode). Here, FIG. 16 is a schematic diagram of the recording medium 161 as shown in a bar graph form so that the utilization conditions, which are described in the present embodiment 2, can be easily viewed.

In this way, a management method such as storage and erasure of the data can be appropriately displayed.

Here, the program management information in the present invention is not necessarily formed of channel, program group, program group recording criterion, program group erasure possibility criterion, recording setter, password, program recording conditions and recording time but, rather, for example, information which depends on the contents of the data maybe added to this and, in short, it may be the information for managing the programs.

In addition, the types of programs of the present invention need not be a program group based on series information which is offered by the broadcasting station as in the above described embodiment 1 but, rather, maybe genres of the programs customized by the user and, in short, may be a concept for properly categorizing the programs. For example, the types of programs of the present invention may be determined based on content titles included in the electronic program information of the image/speech sound contents and the category which is the attribute information of the contents, names of television personalities, content of series information which are broadcast in sequence, summary of the contents and key words which are included therein, or the like, or may be determined based on the original identification information, irrespective of electronic program information, which is inputted by the user when carrying out the recording or setting for recording.

In addition, the program management information according to the present invention need not be formed of present time, maximum recording capacity, program title and channel, program recording capacity (that is to say, the size of the data which containing the contents of the program), broadcast start date and time, number of playbacks/dubbings and erasure possibility as in the above described embodiment 2 but, rather, for example, information which depend on the contents of the data may be added to this and, in short, it may be the information for managing the programs.

In addition, the program information according to the present invention need not be electronic program guide information offered by the broadcasting station through electric wave delivery as in the above described embodiments 1 and 2 but, rather, may be program guide information, offered by the recording medium which is attached to, for example, publications and, in short, may be information with respect to the programs for forming the program management information.

In addition, the setting for recording the programs according to the present invention need not be accepted as the recording indication, as in the above described embodiments 1 and 2 but, rather, maybe rejected in the case that it is impossible to carry out recording as the recording indication at the point in time when the recording indication is carried out.

In addition, the criterion with respect to the erasure possibility according to the present invention need not be set for each program type as in the above described embodiments 1 and 2 but, rather, may be set individually for each program.

In addition, the criterion with respect to the erasure possibility according to the present invention need not be constant regardless of the elapse of time as in the above described embodiments 1 and 2 but, rather, may vary according to the elapse of time such that it is non-erasable for only a preset period and becomes erasable after the period has elapsed.

In addition, the recording of the program according to the present invention need not be started according to the setting for the recording which is carried out by the user in advance as in the above described embodiments 1 and 2 but, rather, may be started immediately by the recording indication of the user.

In addition, the function of each component of the program recording apparatus of the present invention may be implemented with the dedicated hardware and may be implemented with software through the program of the computer.

In addition, the entire, or part of, the function of the entire, or part of, the unit of each of the above described embodiments may be implemented as an operation of the computer which uses a program recorded medium such as an optical disk or an optical magnetic disk characterized by recording program and/or data for implementing the above function by computer so that the read-out program and/or data work cooperatively with the computer to implement the function.

As is clear from the above description the aspect of the present invention corresponding to Claim 1 can provide a program recording apparatus characterized by the appropriate management of the storage, erasure, or the like, of the data.

The second aspect of the present invention corresponding to Claim 2 can provide a program recording apparatus characterized by the management of the storage, erasure, or the like, of the data.

The third aspect of the present invention corresponding to Claim 3 can provide a program recording apparatus characterized by, in addition to the above described effects, the failproof management of data.

The fourth aspect of the present invention corresponding to Claim 4 can provide a program recording apparatus characterized by, in addition to the above described effects, the detailed management of data.

The fifth aspect of the present invention corresponding to Claim 5 can provide a program recording apparatus characterized by, in addition to the above described effects, the practical management of data.

The sixth aspect of the present invention corresponding to Claim 6 can provide a program recording apparatus characterized by, in addition to the above described effects, the even more practical management of data.

The seventh aspect of the present invention corresponding to Claim 7 can provide a program recording apparatus characterized by, in addition to the above described effects, the flexible management of data.

The eighth aspect of the present invention corresponding to Claim 8 can provide a program recording apparatus characterized by, in addition to the above described effects, the simplified management of data.

The ninth aspect of the present invention corresponding to Claim 9 can provide a program recording apparatus characterized by, in addition to the above described effects, the practical management of data.

The tenth aspect of the present invention corresponding to Claim 10 can provide a program recording apparatus characterized by, in addition to the above described effects, the failproof storage of data.

The eleventh aspect of the present invention corresponding to Claim 11 can provide a program recording medium characterized by the appropriate management of storage, erasure, or the like, of data for each type of program.

What is claimed is:

1. A program recording apparatus comprising:
   a program information input unit inputting program information concerning programs;
   a program recording setting unit setting the recording of programs;
   a recording unit writing in, and erasing, data containing the contents of said programs to and from a recording medium; and
   a management unit storing program information which is inputted from said program information input unit and recording said programs by said recording unit according to said setting for recording or independent of said setting for recording,
   wherein said management unit predicts a shortage of vacant space in said recording medium at the point in time when said recording unit carries out the writing in of the data containing the contents of said program, to said recording medium by referring to program management information which includes, at least, said program information, the recording status of said recording medium and recording setting status of said programs and in the case that said vacant space is in shortage, decides programs to be erased when said writing in is carried out among the programs which have already been recorded or which have already been set for recording according to predetermined criteria which include an erasure possibility set prior to erasure of the programs to be erased.

2. A program recording apparatus comprising;

a program information input unit inputting program information concerning programs;

a program recording setting unit setting the recording of programs;

a recording unit writing in and erasing data containing the contents of said programs to and from a recording medium; and a management unit storing program information inputted from said program information input unit and recording said programs by said recording medium according to said setting for recording or independent of said setting for recording, wherein said management unit recognizes a shortage of vacant space in said recording medium by referring to program management information which includes, at least, said program information, recording status of said recording medium and recording setting status of said programs and in the case that said vacant space is in shortage, determines programs to be erased when said writing in is carried out among the programs which have already been recorded or which have already been set for recording according to predetermined criteria which include an erasure possibility set prior to erasure of the programs to be erased.

3. A program recording apparatus according to claim 1 wherein said determination of programs to be erased is carried out by utilizing a criterion concerning said program management information and said erasure possibility.

4. A program recording apparatus according to claim 2 wherein said determination of programs to be erased is carried out by utilizing a criterion concerning said program management information and said erasure possibility.

5. A program recording apparatus according to claim 3 wherein said determination of the programs to be erased is carried out, by utilizing a history of recording operation which is carried out, by said recording unit.

6. A program recording apparatus according to claim 4 wherein said determination of the programs to be erased is carried out, by utilizing a history of recording operation which is carried out, by said recording unit.

7. A program recording apparatus according to claim 1 wherein said determination of the erasure possibility of the programs or said determination of the programs to be erased is carried out by utilizing any of broadcast start date and time, broadcast time, number of viewings and types of said programs which have been recorded or have been set for recording.

8. A program recording apparatus according to claim 2 wherein said determination of the erasure possibility of the programs or said determination of the programs to be erased is carried out by utilizing any of broadcast start date and time, broadcast time, number of viewings and types of said programs which have been recorded or have been set for recording.

9. A program recording apparatus according to claim 1 wherein the criterion concerning said erasure possibility in said predetermined criteria is set for each of the types of said programs.

10. A program recording apparatus according to claim 2 wherein the criterion concerning said erasure possibility in said predetermined criteria is set for each of the types of said programs.

11. A program recording apparatus according to claim 1 wherein said predetermined criteria can be freely changed.

12. A program recording apparatus according to claim 2 wherein said predetermined criteria can be freely changed.

13. A program recording apparatus according to claim 1 wherein said program information is electronic program information.

14. A program recording apparatus according to claim 2 wherein said program information is electronic program information.

15. A program recording apparatus according to claim 7 wherein said types are determined based on the information included in electronic program information and/or the information inputted by the user.

16. A program recording apparatus according to claim 8 wherein said types are determined based on the information included in electronic program information and/or the information inputted by the user.

17. A program recording apparatus according to claim 1 wherein an indication of cancellation of said setting for recording by the user is necessary in order to cancel the setting for recording of said programs which have been set for recording of which the criterion concerning said erasure possibility is non-erasable.

18. A program recording apparatus according to claim 2 wherein an indication of cancellation of said setting for recording by the user is necessary in order to cancel the setting for recording of said programs which have been set for recording of which the criterion concerning said erasure possibility is non-erasable.

19. Computer-readable program code stored on a computer readable recording medium having stored therein a computer-readable program code when executed by a computer causes the computer to control the followig functions of video program recording apparatus:

inputting video program information;
setting the recording of video programs:
writing to, and erasing from a recording medium data containing the contents of video programs:
storing video program information which has been input and recording video programs according to a previously entered setting for recording or independent of any previously entered setting,
predicting a shortage of vacant space in a recording medium at a point in time when data is being written related to the content of a video program, by referring to video program management information which includes, at least, program information, recording status of a recording medium and recording setting status of a video program and if there is insufficient vacant space, determining one or more video programs previously recorded to be erased when writing is carried out or inhibiting the recording of one or more video programs which have been previously designated for recording according to predetermined criteria and which include an erasure possibility previously set.

20. Computer-readable program code stored on a computer readable recording medium having stored therein a computer-readable program code when executed by a computer causes the computer to control the following functions of video program recording apparatus;

inputting video program information;

setting the recording of video programs;

writing to, and erasing from a recording medium, data containing the contents of video programs:

storing video program information previously input and recording video programs by according to previously entered settings for recording or independent of previous settings, recognizing a shortage of vacant space in a recording medium at a point in time when data is being written related to the content of a video program, by referring to video program management information which includes, at least, program information, recording status of a recording medium and recording setting status of a video program and if there is insufficient vacant space, determining one or more video programs previously recorded to be erased when writing is carried out or inhibiting the recording of one or more video programs which have been previously designated for recording according to predetermined criteria and which include an erasure possibility previously set.

21. A program recording apparatus according to claim 9 wherein said types are determined based on the information included in electronic program information and/or the information inputted by the user.

22. A program recording apparatus according to claim 10 wherein said types are determined based on the information included in electronic program information and/or the information inputted by the user.

* * * * *

UNITED STATES PATENT AND TRADEMARK OFFICE
CERTIFICATE OF CORRECTION

PATENT NO. : 7,319,810 B2  Page 1 of 1
APPLICATION NO. : 11/292094
DATED : January 15, 2008
INVENTOR(S) : Hirofumi Wada et al.

It is certified that error appears in the above-identified patent and that said Letters Patent is hereby corrected as shown below:

On the title page, left column, please insert:

--(30), Foreign Priority Data
November 30, 1999     (JP) …………………....11-341024--

Signed and Sealed this

Thirtieth Day of December, 2008

JON W. DUDAS
*Director of the United States Patent and Trademark Office*